US012617323B2

(12) United States Patent (10) Patent No.: US 12,617,323 B2
Pöhlmann (45) Date of Patent: May 5, 2026

(54) BACKREST ELEMENT FOR A VEHICLE SEAT

(71) Applicant: GRAMMER Aktiengesellschaft, Ursensollen (DE)

(72) Inventor: Andreas Pöhlmann, Hirschau (DE)

(73) Assignee: GRAMMER AKTIENGESELLSCHAFT, Ursensollen (DE)

( * ) Notice: Subject to any disclaimer, the term of this patent is extended or adjusted under 35 U.S.C. 154(b) by 106 days.

(21) Appl. No.: 18/460,408

(22) Filed: Sep. 1, 2023

(65) Prior Publication Data
US 2024/0109466 A1 Apr. 4, 2024

(30) Foreign Application Priority Data
Sep. 30, 2022 (DE) ..................... 10 2022 125 400.3

(51) Int. Cl.
B60N 2/68 (2006.01)
B60N 2/64 (2006.01)

(52) U.S. Cl.
CPC .................. B60N 2/68 (2013.01); B60N 2/64 (2013.01); B60N 2/686 (2013.01)

(58) Field of Classification Search
CPC .................................. B60N 2/68; B60N 2/688
See application file for complete search history.

(56) References Cited

U.S. PATENT DOCUMENTS

| | | | | | |
|---|---|---|---|---|---|
| 3,131,971 | A | * | 5/1964 | Gunn ........................ | A47C 5/04 |
| | | | | | 297/452.2 |
| 4,993,778 | A | * | 2/1991 | Colin ...................... | B60R 22/26 |
| | | | | | 297/483 |
| 5,568,961 | A | * | 10/1996 | Colasanti ................. | B60N 2/68 |
| | | | | | 297/354.1 |
| 5,645,316 | A | * | 7/1997 | Aufrere ................... | B60N 2/688 |
| | | | | | 297/483 |
| 5,791,738 | A | * | 8/1998 | Niezoldt .................. | B60N 2/68 |
| | | | | | 297/452.2 |
| 6,027,167 | A | * | 2/2000 | Blomdell ................. | B60N 2/68 |
| | | | | | 297/216.1 |
| 8,960,790 | B2 | * | 2/2015 | Fujita .................... | B60N 2/4221 |
| | | | | | 297/216.13 |

(Continued)

FOREIGN PATENT DOCUMENTS

| | | | | | | |
|---|---|---|---|---|---|---|
| CN | | 108312921 | A | * | 7/2018 | ............. B60N 2/242 |
| CN | | 109263523 | A | * | 1/2019 | ............... B60N 2/68 |

(Continued)

OTHER PUBLICATIONS

Official Action for Germany Patent Application No. 102022125400.3, dated Feb. 8, 2023, 12 pages.

(Continued)

*Primary Examiner* — Timothy J Brindley
(74) *Attorney, Agent, or Firm* — Sheridan Ross P.C.

(57) ABSTRACT
The invention relates to a backrest element for a vehicle seat, the backrest element comprising at least one frame element formed by a tubular element and forming at least one section of the backrest element, wherein a contour of the at least one frame element is given by a plurality of bends of the tubular element and is formed such that at least one inner surface is enclosed by the tubular element.

16 Claims, 7 Drawing Sheets

(56)                References Cited

U.S. PATENT DOCUMENTS

|  |  |  |  |  |
|---|---|---|---|---|
| 8,979,206 | B2 * | 3/2015 | Matsuzaki | B60N 2/682 |
|  |  |  |  | 297/452.33 |
| 9,108,555 | B2 * | 8/2015 | Uebelacker | B60R 22/26 |
| 10,137,811 | B2 * | 11/2018 | Akaike | B60N 2/68 |
| 11,084,403 | B1 * | 8/2021 | Muck | B60N 2/501 |
| 11,833,946 | B2 * | 12/2023 | Pinto | B60N 2/4221 |
| 11,975,639 | B2 * | 5/2024 | Niwa | B60N 2/42709 |
| 2003/0116999 | A1 | 6/2003 | Fujita et al. |  |
| 2024/0359607 | A1 * | 10/2024 | Piederriere | B60N 2/6009 |

FOREIGN PATENT DOCUMENTS

| CN | 117818440 | A | * | 4/2024 | B60N 2/68 |
|---|---|---|---|---|---|
| DE | 68906113 |  |  | 2/1994 |  |
| DE | 4303006 | A1 | * | 8/1994 | B60N 2/68 |
| DE | 19741602 | A1 | * | 3/1999 | B60N 2/68 |
| DE | 19847401 |  |  | 4/2000 |  |
| DE | 202005004094 |  |  | 6/2005 |  |
| DE | 102006033513 |  |  | 1/2008 |  |
| DE | 102011015364 |  |  | 10/2012 |  |
| DE | 102016117564 |  |  | 3/2018 |  |
| EP | 1226999 |  |  | 7/2002 |  |
| FR | 2985468 | A1 | * | 7/2013 | B60N 2/7005 |
| FR | 3144579 | A1 | * | 7/2024 | B60N 2/686 |
| FR | 3144581 | A1 | * | 7/2024 | B60N 2/56 |
| WO | WO-2014195649 | A1 | * | 12/2014 | B60N 2/809 |
| WO | WO-2024122338 | A1 | * | 6/2024 | B60N 2/90 |

OTHER PUBLICATIONS

Official Action for Germany Patent Application No. 102022125400. 3, dated Apr. 19, 2024, 5 pages.
Extended European Search Report (no English translation available) for Europe Patent Application No. 23193292.2, dated Feb. 5, 2024, 6 pages.
Article 94(3) Communication for Europe Patent Application No. 23193292.2, dated Feb. 4, 2026, 5 pages.
Official Action for Brazil Patent Application No. BR102023019455-9, dated Sep. 23, 2025, 4 pages.

* cited by examiner

BACKREST ELEMENT FOR A VEHICLE SEAT

CROSS REFERENCE TO RELATED APPLICATION

This application claims the benefit of German Patent Application No. 10 2022 125 400.3, filed Sep. 30, 2022, the contents of which are incorporated herein by reference in its entirety.

FIELD

The invention relates to a backrest element for a vehicle seat comprising a frame element and a vehicle seat comprising such a backrest element.

BACKGROUND

Such vehicle seats are suitable for commercial vehicles, for example trucks, tractors or construction machines or similar vehicles. Usually, such backrest elements are welded together from various individual parts. For example, several spars are welded together with connecting and/or stiffening plates or sheets. The disadvantage here is the number of parts and the number or total length of the weld seams. It would also be desirable to reduce the weight of the backrest element. A further disadvantage is that the prefabricated individual parts mean that there is little flexibility in terms of redesigning the backrest.

SUMMARY

It is the object of the invention to provide a backrest element in which the above-mentioned disadvantages are overcome or at least reduced.

The object is solved by the object of the backrest element of the invention. Advantageous embodiments are to be taken from the detailed description of the invention.

The core idea of the invention is a backrest element for a vehicle seat, wherein the backrest element comprises at least one frame element which is formed by a tubular element and shapes at least one section of the backrest element, wherein a contour of the at least one frame element is given by a plurality of bends of the tubular element and is configured in such a way that at least one inner surface is enclosed by the tubular element.

By using the at least one frame element which forms a portion of the backrest element by means of a plurality of bends of a tubular element, a plurality of welded joints can be avoided. Furthermore, the number of components to be welded is also significantly reduced. Consequently, the weight of the backrest element is also reduced. In addition, the number of tools required to manufacture the backrest element is greatly reduced. By using modern CNC bending machines, the contour of the frame element can be easily reshaped if necessary, allowing a high degree of design flexibility in accordance with the requirements of the backrest element.

In engineering mechanics, bend refers to a mechanical change in the geometry of slender components, such as the tubular element. Typical bends are changes in the curvature of the centerline or surface compared to the curvature that the component had in the unstressed state, due to static and dynamic stresses.

The backrest element extends along a longitudinal axis X, along a width axis Y and along a height axis Z.

According to a particularly advantageous embodiment, the backrest element comprises a lower region suitable and intended for providing support in the lumbar vertebral region of the occupant. Advantageously, the backrest element comprises an upper region suitable and intended for providing support in the shoulder region of the occupant and/or for receiving or providing a headrest.

Advantageously, the frame element is formed of a one-piece tubular element. A one-piece design in this context means that all sections are made from a single and uniform part.

According to a further particularly advantageous embodiment, the frame element comprises a belt section which is intended and suitable for arranging a belt device thereon. Preferably, the belt section is provided in the upper portion of the backrest element. Advantageously, in a lower end of belt section along a longitudinal axis X, two sections of the tubular element are adjacent to each other substantially along a height axis Z. These superimposed sections of the tubular element may also be referred to as the entanglement of the tubular element. The superimposed sections of the tubular element provide local reinforcement of the frame or backrest element. Due to the arrangement of the belt device on the belt section, an increased force is exerted on the belt section in the event of an accident or crash. In particular, in the area where the sections of the tubular element overlap, the forces that occur are especially large. As a rule, a large proportion of the force action is directed forward along the height direction Z. The described advantageous juxtaposition of the first section of tubular element and the second section of the tubular element along the height axis Z takes just such an effect of force into account.

According to a further preferred embodiment, the belt section is formed in such a way that it bounds a first inner surface. Advantageously, a first plate-like element is arranged in this first inner surface, at least in sections. Accordingly, the first plate-like element can fill the entire first inner surface or only a part of the first inner surface. Preferably, the first plate-like element is attached to the belt section by means of a material connection. Thus, the material connection exists between the sections of the tubular element forming the belt section, respectively delimiting or enclosing the first inner surface, and the first plate-like element. Such a material connection is preferably a welded connection. Alternatively or cumulatively, further connections can be provided between the first plate-like element and the belt section, for example non-positive and/or positive connections in the form of screw connections, rivet connections, snap connections, etc. The first plate-like element is advantageously made of metal and is, for example, a metal sheet. It is further advantageous that the first plate-like element has means for fastening a belt device, for example bores, projections, receptacles, etc., or a combination of said means.

According to a further preferred embodiment, the upper region of the backrest element comprises the frame element. Preferably, only one frame element is provided in the upper region of the backrest element. Advantageously, the frame element is arranged on a lower backrest element portion forming the lower region of the backrest element. The lower backrest element portion can, for example, be formed as a standard element and comprise a corresponding receptacle for the frame element. Accordingly, the backrest element would comprise only a frame element which is at least an outer frame for the upper region of the backrest element. Advantageously, a belt section of the frame element is further provided in the upper portion.

Advantageously, the belt section as well as the section suitable for receiving or forming a headrest and/or for supporting the shoulder area are thus formed by a single one-piece tubular element. However, an embodiment without the belt section would be conceivable, which can be used for vehicle seats without belt integration. The frame element comprising the upper region of the backrest element is formed only by bends of a tubular element. The frame element can be flexibly formed by the bending process, and thus can be adapted with respect to various configurations of the lower backrest element portion.

It would also be conceivable that the lower backrest element portion comprises a second frame element, which is formed from a second tubular element and whose contour is given at least by a plurality of bends of this tubular element.

According to a further advantageous embodiment, the lower region of the backrest element and the upper region of the backrest element comprise the at least one frame element. Advantageously, only one frame element is provided. Preferably, a single frame element formed from only one tubular element thus forms at least one outer frame for the backrest element. Preferably, this single frame element comprises a belt section. However, an embodiment without a belt section is also conceivable, which can be used for vehicle seats without belt integration.

Preferably, the frame element can constitute an outer framework of the backrest element, to which further elements, for example support plates or sheets or struts, are arranged. In contrast to conventional backrest elements, a backrest element with such a frame element can be manufactured more effectively and also has a lower weight.

According to a further advantageous embodiment, a lower portion of the frame element has two loop-like segments which are spaced apart along a width axis Y. Preferably, the loop-like segments each enclose a second inner surface. Advantageously, a second plate-like element is arranged in or on each of the two second inner surfaces, at least in sections. The respective lateral second plate-like element can thus fill the entire respective second inner surface or also only a part of the respective second inner surface. Preferably, the respective second plate-like element is arranged on the respective loop-like segments by means of a material connection. The material connection thus exists between the respective second plate-like element and the sections of the tubular element which form the respective loop-like segment or delimit or enclose the respective second inner surface. Such a material connection is preferably a welded connection. Alternatively or cumulatively, further connections can be provided between the respective second plate-like element and the respective loop-like segment, for example force-locking and/or form-locking connections in the form of screw connections, rivet connections, snap connections, etc. The respective second plate-like element advantageously consists of metal and is, for example, a metal sheet. Furthermore, it is advantageous that the respective second plate-like element has corresponding means to enable an arrangement of a recliner device, for example holes, apertures, protrusions, etc., or a combination of said means.

Advantageously, the respective loop-like segment comprises a third section of tubular element extending downward along the longitudinal axis X and a fourth section of tubular element extending upward along the longitudinal axis X.

Preferably, the third section is connected to the fourth section via a curved fifth section of tubular element. In this regard, it is advantageous that in a lower portion of loop-like segment the third section and the fourth section are spaced along the height axis Z. Thus, the second inner surface is located between the third section and the fourth section. In an upper region of the loop-like segment, the third section and the fourth section are adjacent to each other. Further, advantageously, a transverse portion of the tubular element is provided which extends along the width axis Y between the upper portions of the two loop-like segments. Advantageously, the bend of the fifth section and thus also the creation of the loop-like segments is effected by a bend of the transverse section from a plane parallel to a plane spanned by the longitudinal axis X and the width axis Y by approximately 180° upwards, so that the transverse section abuts sections of the tubular element lying further upwards.

Advantageously, all adjacent sections of the tubular element of the frame element are joined by means of a material connection. Such a material connection is preferably a welded connection. Alternatively or cumulatively, further connections can be provided between the respective sections of the tubular element, for example non-positive and/or positive connections in the form of screw connections, rivet connections, snap connections, etc. Such connections ensure increased stability of the frame element.

Advantageously, at least one further plate-like element and/or a support strut is arranged on the frame element. The further plate-like element may be arranged in the lower region of the frame element and serve to support an occupant in the lumbar vertebral region. Such plate-like element may be made of a metal and may be, for example, a sheet metal. Of course, further support plates or struts may be arranged on the frame element. Furthermore, further elements may be arranged or provided on the frame element as means for fastening, for example holes, apertures, projections, etc.

The present object is further solved by a vehicle seat with a backrest element according to one of the embodiments described above. The vehicle seat can be equipped with all the features already described above in the context of the backrest element, either individually or in combination with one another, and vice versa.

The present object is further solved by a method for manufacturing a backrest element for a vehicle seat. The method comprises the following steps:

Providing a tubular element;

Bending the tubular element a plurality of times by means of a first tube bending machine, thereby creating a preform;

Applying of a rod-like auxiliary tool.

Bending the preform about the rod-like auxiliary tool such that a lower end of preform is brought to a middle section of preform.

Preferably, the first tube bending machine is a CNC tube bending machine. Advantageously, the method further comprises at least one of the following steps:

Joining abutting portions of the tubular element, preferably by means of a welded joint;

Arranging at least one plate-like element and/or a support strut preferably by means of a welded joint.

Thereby, the described method has the same advantages and embodiments, individually or in combination as in connection with the above-described backrest element and/or vehicle seat.

Further advantages, objectives and features of the present invention will be explained with reference to the following description of the accompanying figures. Similar components may have the same reference signs in the various embodiments.

DETAILED DESCRIPTION

Figure 1:
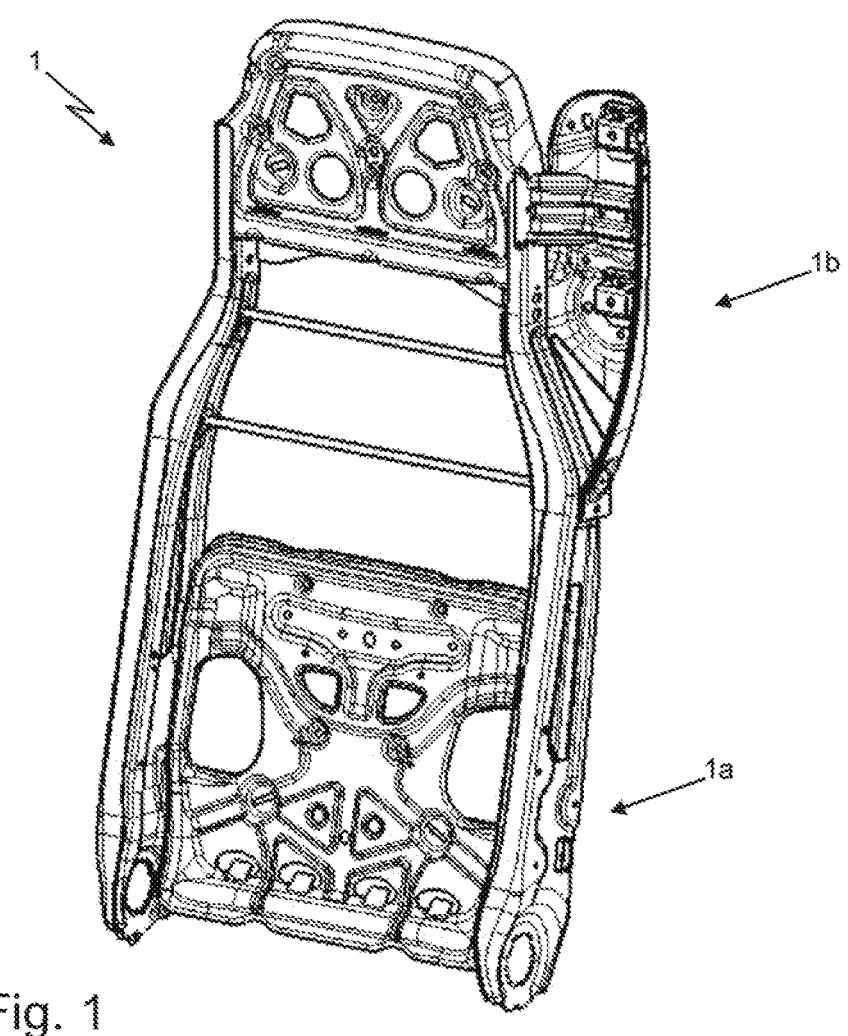
FIG. 1 a backrest element according to the prior art.

FIG. 1 shows a backrest element 1 from the prior art. This backrest element 1 is adjusted with regard to further elements, for example upholstery, covers, recliners, cover attachments, etc. Such elements are not shown in the further description. Of course, such elements can still be provided in the embodiments shown. The backrest element 1 shown in FIG. 1 consists of a large number of individual parts welded together in the form of bars and various metal sheets.

In FIGS. 2 to 6, 7b and 8 to 10, a backrest element 1 for a vehicle seat 100 is shown, the backrest element 1 comprising at least one frame element 2 which is formed by a tubular element 3 and shapes at least one section of the backrest element 1, a contour of the at least one frame element 2 being given by a plurality of bends 4 of the tubular element 3 and being shaped in such a way that at least one inner surface 5 is enclosed by the tubular element 3.

The backrest element 1 and the frame element 2 extend along a longitudinal axis X, along a width axis Y and along a height axis Z. As can be seen from the figures, the frame elements 2 comprise a plurality of bends 4. These bends 4 are only exemplarily marked with the corresponding reference sign, i.e. not all bends 4 are marked with a reference sign.

The backrest element 1 comprises a lower region 1a suitable and intended to provide support in the lumbar region of the occupant, and an upper region 1b suitable and intended to provide support in the shoulder region of the occupant and/or to receive or provide a headrest.

The embodiments of the frame element 2 shown in the figures all comprise a belt section 7, which is intended and suitable for arranging a belt device thereon. The belt section 7 is provided in the upper region 1b of the backrest element 1. However, the provision of the belt section 7 is not intended to be a limitation of generality. Embodiments without such a belt section 7 would also be conceivable. Such backrest elements 1 are to be used for vehicle seats 100 without a belt integration.

The belt section 7 has an upper portion 7b, in which the latter is substantially rectangular in shape. Accordingly, the belt section 7 is formed in the upper portion 7b by an inner section 20 of the tubular element 3 and an outer section 21 of the tubular element 3. These two sections 20, 21 are interconnected by a second transverse section 22 of the tubular member 3. The inner section 20 of the tubular element 3 and the outer section 21 of the tubular element 3 are spaced apart from each other along the width axis Y in the upper portion 7b. Towards the lower end 7a of belt section 7, the inner section 20 the outer section 21 extend together along width axis Y in a V-like manner. Further, the inner section 20 and the outer section 21 extend outwardly along the height axis Z in opposite directions until they join the first section 8 of the tubular element 3 and the second section 9 of the tubular element 3. In the lower end 7a, along a longitudinal axis X, of the belt section 7, two sections 8, 9 of the tubular element 3 in the form of the first section 8 and the second section 9 are adjacent to each other substantially along a height axis Z. Accordingly, the first 8 and the second section 9 are entangled or twisted together. Advantageously, these abutting first 8 and second sections 9 are welded together.

The belt section 7 is further formed in such a way that it bounds a first inner surface 5, 5a. In this first inner surface 5, 5a a first plate-like element 10 is arranged at least in sections. The first plate-like element 10 is thereby fastened to the belt section 7 or the inner section 20 and the outer section 21 of the tubular element 3 by means of a material connection in the form of a welded joint. The belt device can then be fastened to this first plate-like element 10. For this purpose, the first plate-like element 10 has corresponding means in the form of holes, projections, openings, etc.

Figure 2:
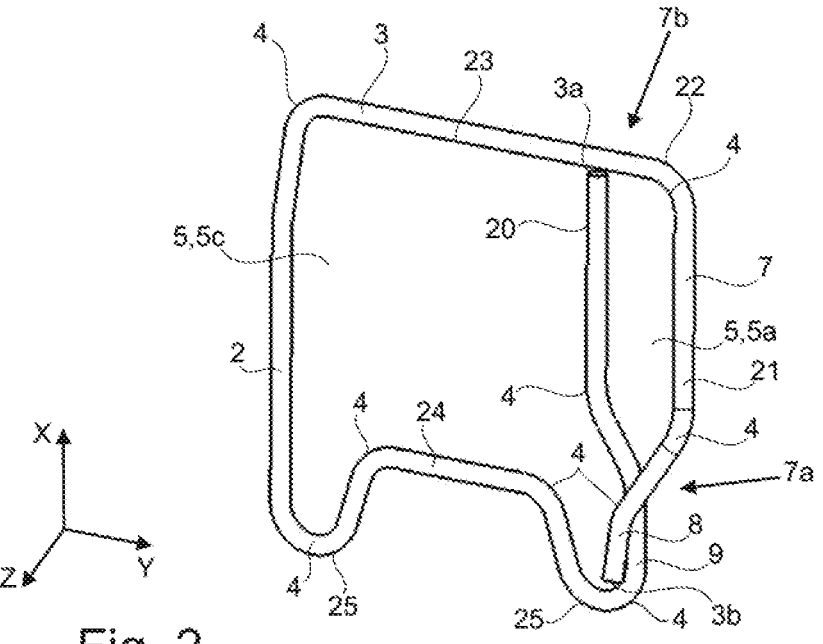
FIG. 2 a frame element according to one embodiment.
Figures 3, 4:
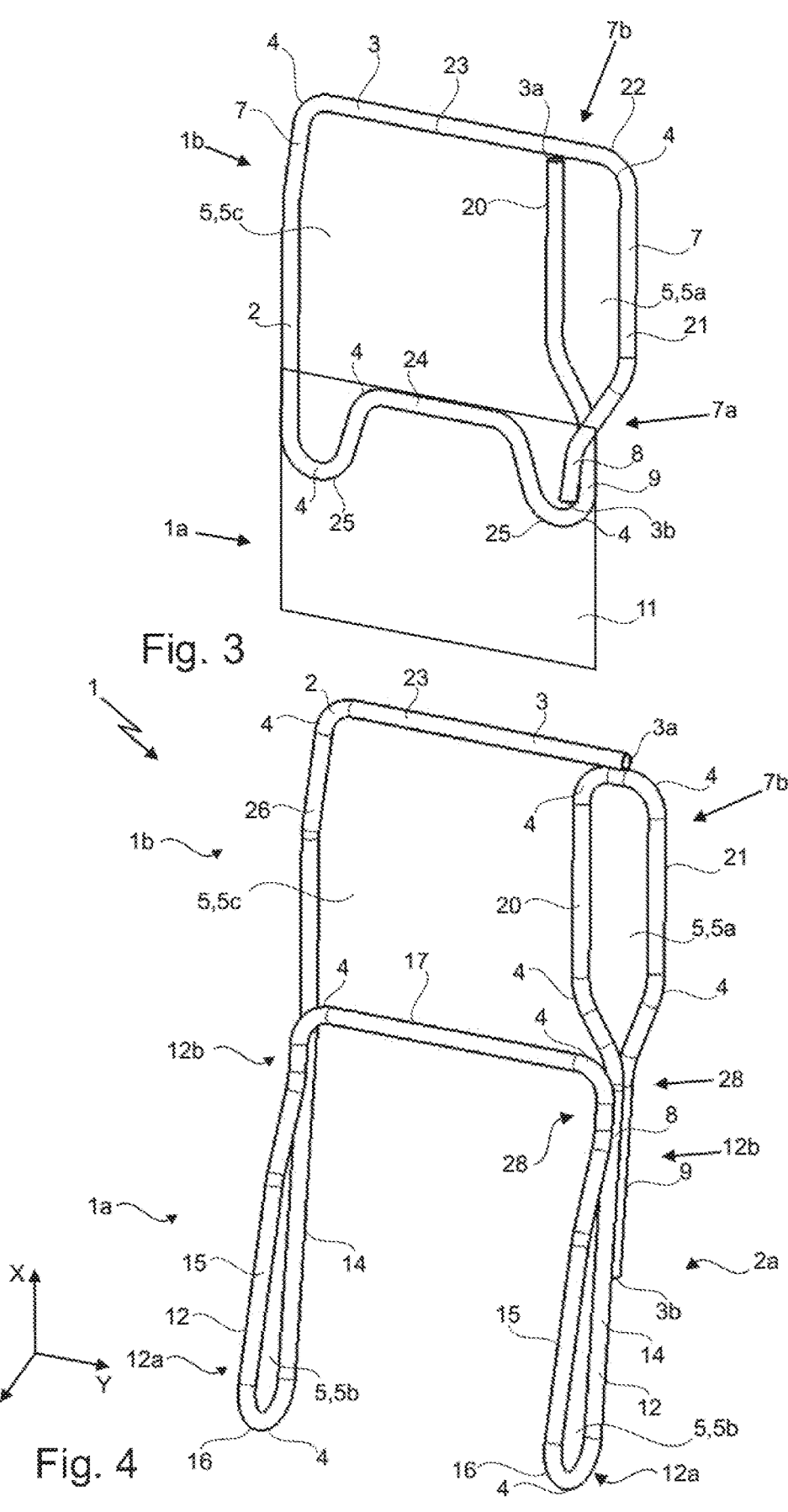
FIG. 3 a backrest element according to one embodiment.
FIG. 4 a frame element according to a further embodiment.

According to a first embodiment shown in FIGS. 2 and 3, a frame element 2 is provided which constitutes a frame for the upper region 1b of the backrest element 1. Accordingly, the frame element 2 is suitable for and intended to receive a head support. The frame element 2 may be arranged on a lower backrest element portion 11, which forms the lower region 1a of the backrest element 1. This can be seen in FIG. 3. Such a lower backrest element portion 11 may comprise standard elements which are advantageously welded together. Alternatively, the lower backrest element portion 11 may comprise a further frame element 2, which is formed from a tubular element 3.

Furthermore, the frame element 2 comprises a belt section 7 as described above. In this embodiment, the inner section 20 of tubular element 3 opens into the first end 3a of tubular element. This first end 3a abuts the second transverse section 22 of the tubular element 3 and is advantageously welded thereto. The second transverse section 22 of the tubular element 3 is part of a third transverse section 23 which extends straight over the entire extension along the width axis Y of the frame element 2. As already explained, the outer section 21 merges into the second portion 9 of the tubular element 3. The second portion 9 then opens into the second end 3b of tubular element 3.

Along the longitudinal axis X opposite the third transverse section 23 is a fourth transverse section 24 of the tubular element 3, which has a straight central section along the width axis Y, each of which laterally merges into a substantially U-shaped bend 25. A first U-shaped bend 25 merges into the first section 8. A second U-shaped bend 25 is connected to the third transverse section 23 via a lateral section 26. By means of the two U-shaped bends 25, the frame element 2 can be arranged or fastened to the lower backrest element portion 11.

The third transverse section 23, the fourth transverse section 24, the lateral section 26 and the belt section 7 enclose a third inner surface 5, 5c.

According to the embodiment shown in FIGS. 4, 5,6, 7b, 8 and 10, the lower region 1a of the backrest element 1 and the upper region 1b of the backrest element 1 comprise the at least one frame element 2, wherein only one frame element 2 is provided, which is formed or bent from a one-piece tubular element 3. Also in this embodiment, the frame element 2 comprises the belt section 7 described above, which also comprises the inner section 20, the outer section 21, the second transverse section 22, the first section 8 and the second section 9 of the tubular element 3. These sections run as already described above.

Also in this embodiment, the first 8 and the second section 9 are adjacent to each other along the height axis Z. Further, according to this embodiment, the frame element 2 comprises a third transverse section 23 extending straight along the width axis Y. However, in contrast to the first embodiment, here the second transverse section 22 is not part of the third transverse section 23. Rather, the third transverse section 23 is arranged along the longitudinal axis X above the second transverse section 22 and abuts against the latter. Advantageously, the two transverse sections 22, 23 are welded together. The third transverse section 23 opens into the first end 3a of the tubular element 3, which is thus arranged above the second transverse section 22. The second portion 9 of tubular element 3 further opens into the second end 3b of tubular element 3.

Figures 5, 6:
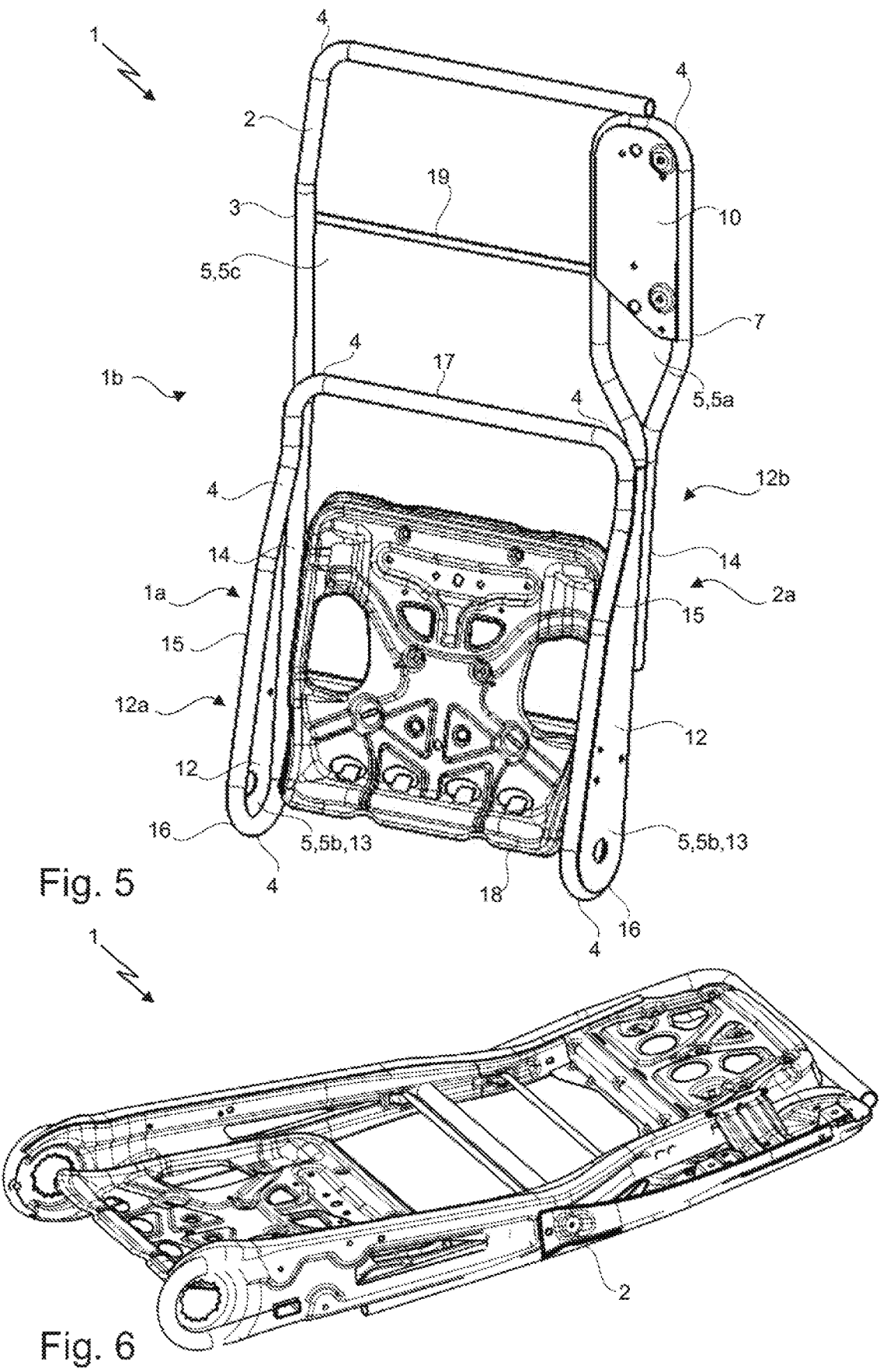
FIG. 5 a backrest element according to a further embodiment.
FIG. 6 a backrest element according to a further embodiment.

A lower portion 2a of frame element 2 has two loop-like segments 12, which are spaced apart along a width axis Y. The loop-like segments 12 each enclose a second inner surface 5, 5b. In FIG. 5, it can be seen that a respective second plate-like element 13 is arranged in or on the second inner surfaces 5, 5b, at least in sections. Preferably, the respective second plate-like element 13 is welded to the loop-like segment 12. The second plate-like element 13 has means for enabling a recliner to be arranged, for example holes, apertures, projections, etc., or a combination of said means.

The respective loop-like segment 12 comprises by a third section 14 of the tubular element 3 extending downwardly along the longitudinal axis X and a fourth section 15 of the tubular element 3 extending upwardly along the longitudinal axis X. The respective third section 14 is connected to the respective fourth section 15 via a bent fifth section 16 of the tubular element 3.

In a lower portion 12a of loop-like segment 12, third section 14 and fourth section 15 are spaced along Height axis Z. In an upper portion 12b of the loop-like segment 12, the third section 14 and the fourth section 15 are adjacent to each other. Preferably, the third section 14 and the fourth section 15 are welded together in the upper portion 12b. By this arrangement, the second inner surface 5, 5b is enclosed.

One of the two third sections 14 merges into the first section 8 along the longitudinal axis X. The second section 9 thus extends along the longitudinal axis X further along the third section 14 until it opens into the second end 3b. The further third section 14 merges along the longitudinal axis X into the lateral section 26, which in turn merges into the third lateral section 23.

Furthermore, a first transverse section 17 of the tubular element 3 is provided, which extends along the width axis Y between the upper portions 12b of the two loop-like segments 12. As can be seen, for example, in FIG. 4, the two fourth sections 15 are bent towards the respective third sections 14 so that they rest on the third sections 14 in the upper region 12b. The first transverse section 17 is thus arranged along the height axis Z above the third sections 14. Further, the first transverse section 17 is arranged substantially parallel to the third transverse section 23 and further opposite thereto.

The first transverse section 17, the third transverse section 23, the lateral section 26 and the belt section 7 thus enclose a third inner surface 5, 5c.

In FIG. 5, it can be seen that the first plate-like element 10 is arranged in the belt section 7. Furthermore, it can be seen that another plate-like element 18 is arranged between the two loop-like segments 12. This plate-like element 18 serves to support the lumbar region of an occupant. Likewise, a support strut 19 is provided between the lateral section 26 and the belt section 7, which serves to increase stability in this area. The backrest element 1 shown in FIG. 5 thus comprises 7 components and weighs 5.32 kg. It is estimated that approx. 30 weld seams are required for manufacture. The weld length is estimated to be 985 mm. In comparison, the backrest element 1 in FIG. 1 comprises 15 components and weighs 5.36 kg. 68 welds are required for fabrication. The weld length is estimated to be 2467 mm.

In FIG. 6, a prior art backrest and the frame element 2 of FIG. 4 are graphically superimposed. It can be seen, for example, that the first transverse strut 17 is at the level of a support strut 19, which would render the latter superfluous.

Figure 7A:
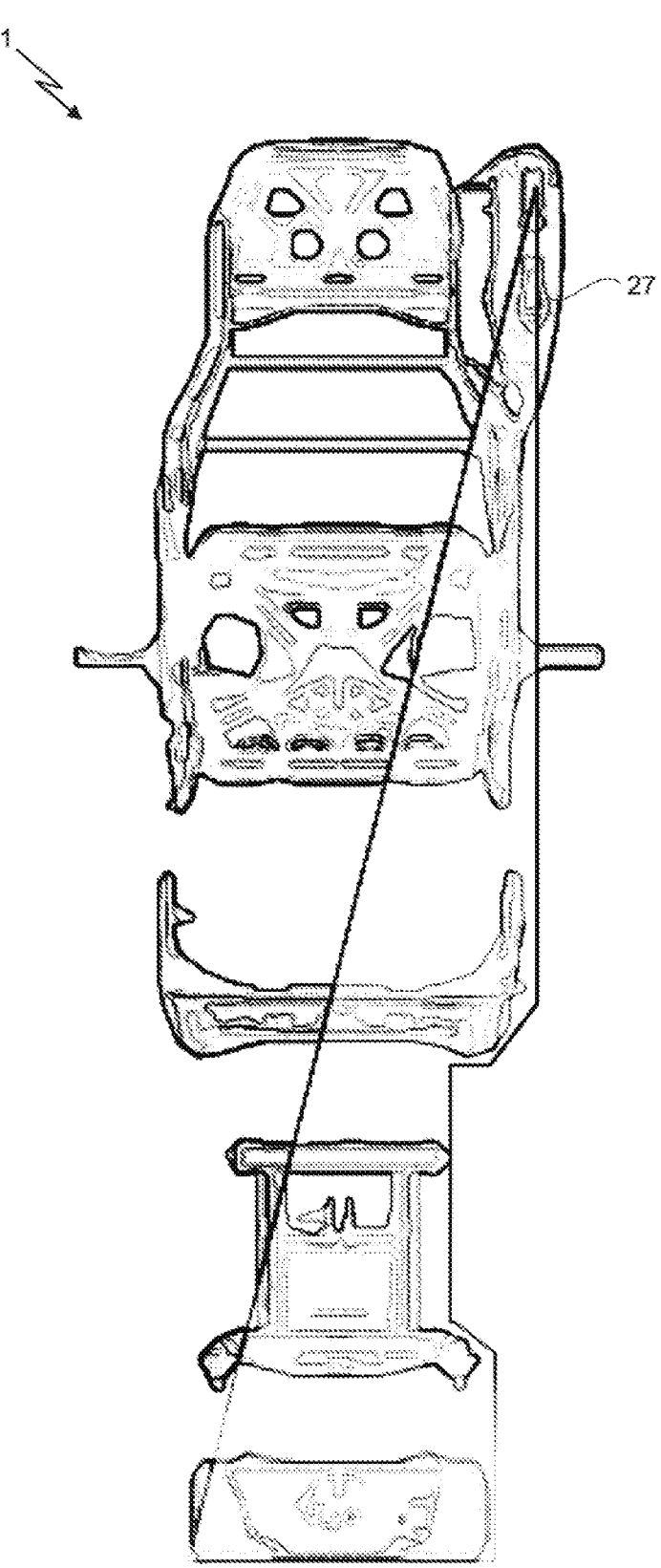
FIG. 7a Force application to a vehicle seat during a crash.
Figures 7B, 7C:
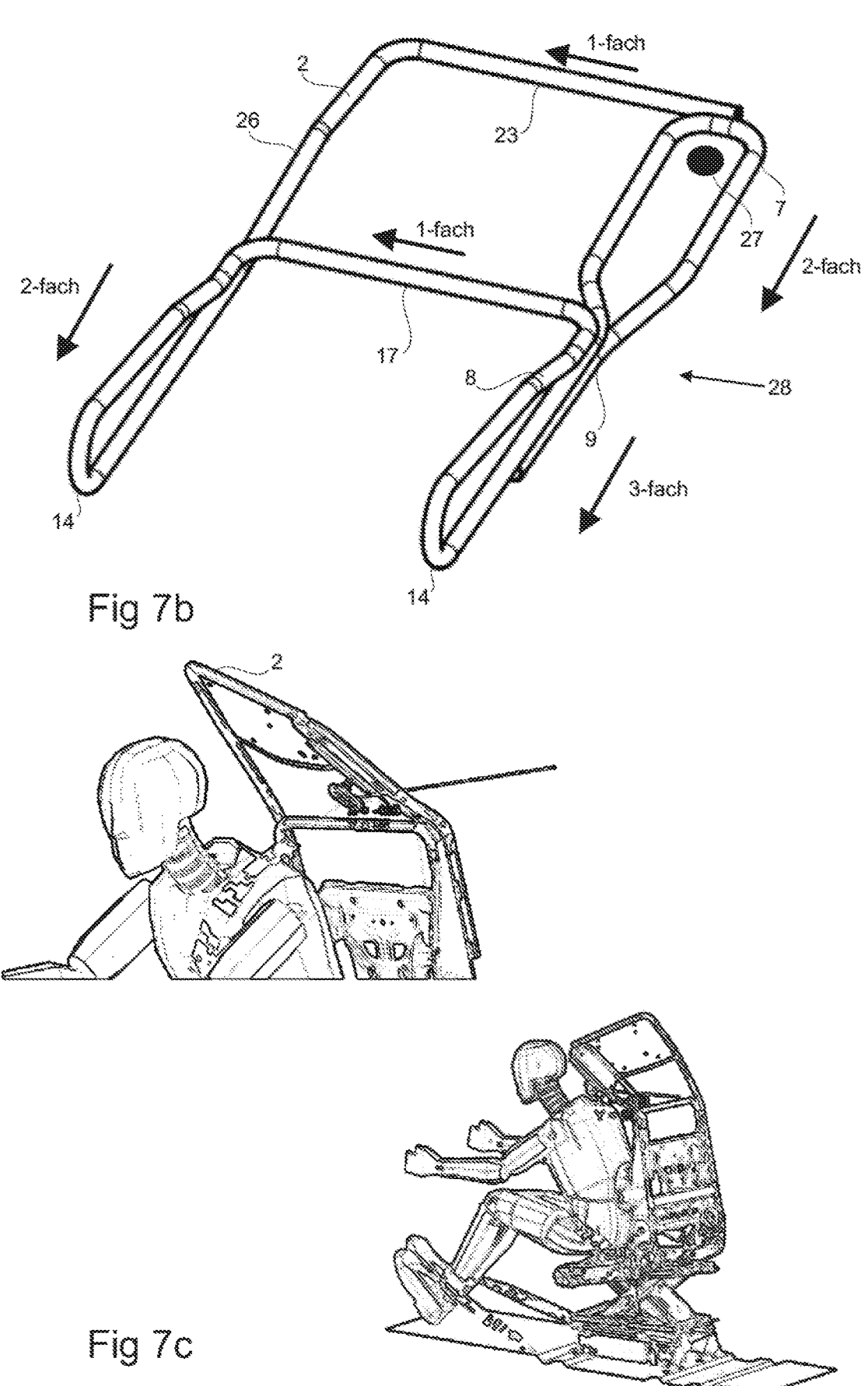
FIG. 7b Force application on a frame element.
FIG. 7c Deformations of a frame element during a crash simulation.

FIG. 7a shows a prior art backrest and a corresponding force application 27 during a crash. FIG. 7b shows the introduction of the force through the frame element 2 in a seat base not shown. A force application 27 causes a 1-fold force to act along the third transverse section 23 and along the first transverse section 17. A 2-fold force acts downward along the longitudinal axis X in the belt section 7. A 3-fold force acts in the loop-like segment 12 located below the belt section 7. A 2-fold force acts in the opposite loop-like segment 12. A force application 27 by armrests not shown has been taken into account here. FIG. 7c shows deformations of frame element 2 during a crash simulation.

In frame element 2, the critical point 28 at which maximum deformation and force occur is reinforced by three superimposed sections in the form of the first section 8, the second section 9 and the fourth section 15. Accordingly, the frame element 2 has an extremely stable configuration.

Figures 9, 10:
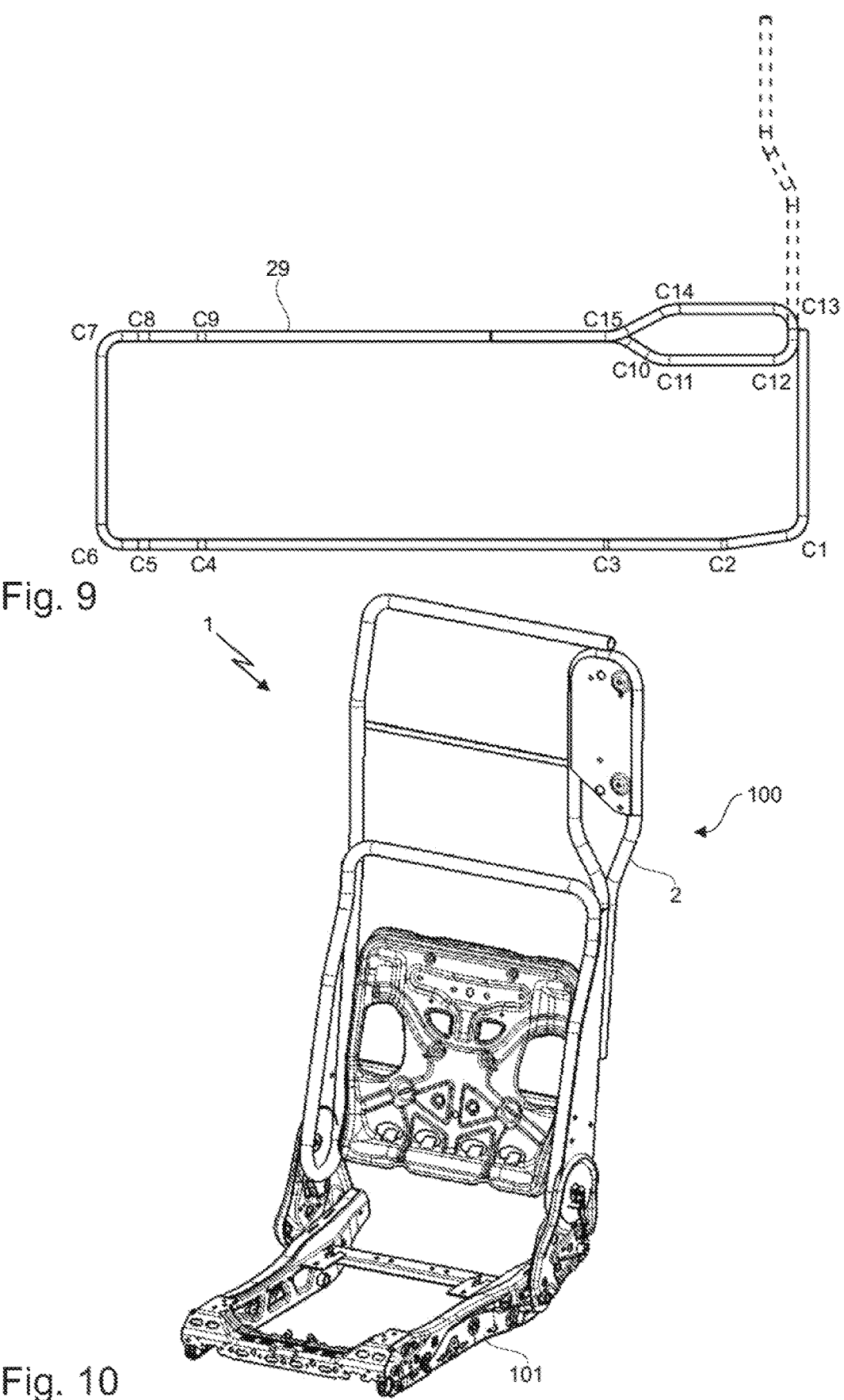
FIG. 9 Preform of a frame element
FIG. 10 Vehicle seat with a frame element according to one embodiment.

FIG. 10 shows a vehicle seat 100 with a backrest element 2 and a seat part 101.

The backrest element 1 can be provided by means of a method for manufacturing a backrest element 1 for a vehicle seat 100. The method comprises the following steps:

a) Providing a tubular element 3;

b) Bending the tubular element 3 several times by means of a first tube bending machine, preferably a CNC tube bending machine, thereby creating a preform 29;

c) Applying a rod-like auxiliary tool 30;

d) Bending the preform 29 around the rod-like auxiliary tool 30 such that a lower end 29a of the preform 29 is brought to a middle section 29b of the preform 29.

Figure 8:
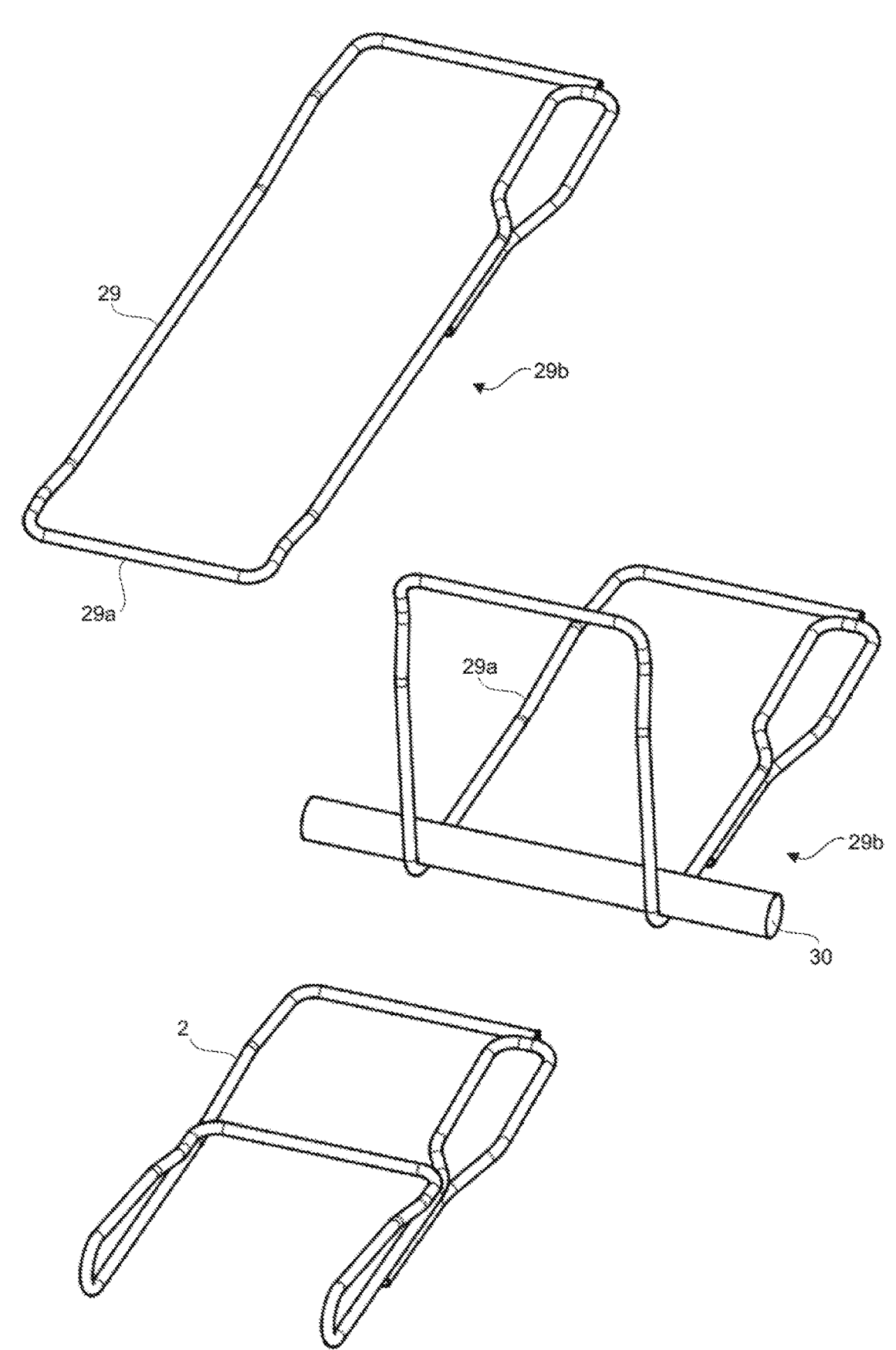
FIG. 8 Sketch of the process for manufacturing a backrest element.

In FIG. 8, this process is shown schematically. FIG. 9 further shows the preform 29 in detail. The bends 4 of the preform 29 are shown and marked C1 to C15. The bends 4 are bent with ascending number by the first tube bending machine.

In step a), the bends 4 C1 to C9 are advantageously produced first. Then a 180° rotation takes place by means of a first robot. Then the remaining bends 4 C15 to C10, but not the bend 4 C13, are generated. The preform 29 is now removed from the tube bending machine by a second robot, which preferably comprises two grippers. Now the bend 4 C13 is bent by means of the tube bending machine.

The rod-like auxiliary tool 30 is then applied. See FIG. 8, middle illustration. Finally, in step d), the preform 29 is bent around the rod-like auxiliary tool 30 such that a lower end 29a of preform 29 is brought to a middle section 29b of preform 29.

Advantageously, the method further comprises at least one of the following steps:

Joining abutting portions of the tubular element 3, preferably by means of a welded joint;

Arranging at least one plate-like element 18 and/or a support strut 19 preferably by means of a welded joint.

The tubular element 3 advantageously has a diameter in a range between 10 and 40 mm, more preferably in a range between 15 mm and 25 mm, more preferably 20 mm. The wall thickness is preferably in a range between 0.5 mm to 3 mm, more preferably in a range between 1 mm and 2.5 mm, more preferably at 1.5 mm.

The applicant reserves the right to claim all features disclosed in the application documents as essential to the invention, provided that they are individually or in combination new compared to the prior art. It is further pointed out that the individual figures also describe features which may be advantageous in themselves. The person skilled in the art recognizes immediately that a certain feature described in a figure can also be advantageous without adopting further features from this figure. Furthermore, the skilled person recognizes that advantages can also result from a combination of several features shown in individual figures or in different figures.

LIST OF REFERENCE SIGNS

1 Backrest element
1a Lower region of the backrest element
1b Upper region of the backrest element
2 Frame element
2a Lower portion of frame element
3 Tubular element
3a First end of tubular element
3b Second end of tubular element
4 Bend
5 Inner surface
5a First inner surface
5b Second inner surface
5c Third inner surface
7 Belt section
7a Lower end of belt section
7b Upper portion of belt section
8 First section of tubular element
9 Second portion of the tubular member
10 First plate-like element
11 Lower backrest element portion
12 Loop-like segment
12a Lower portion of loop-like segment
12b Upper portion of the loop-like segment
13 Second plate-like element
14 Third section of tubular element
15 Fourth section of the tubular element
16 Fifth section of the tubular element
17 First transverse section of the tubular element
18 Plate-like element
19 Support strut
20 Inner section of the tubular element
21 Outer section of the tubular element
22 Second transverse section of the tubular element
23 Third transverse section of the tubular element
24 Fourth transverse section of the tubular element
25 U-shaped bend
26 Lateral section
27 Force application
28 Critical point
29 Preform
29a Lower end of preform
29b Middle section of preform
30 Rod-like auxiliary tool
100 Vehicle seat

101 Seat part
X Longitudinal axis
Y Width axis
Z Height axis

What is claimed is:

1. A backrest element for a vehicle seat,
wherein the backrest element comprises at least one frame element which is formed by a tubular element and shapes at least one section of the backrest element, a contour of the at least one frame element being given by a plurality of bends of the tubular element and being designed in such a way that at least one inner surface is enclosed by the tubular element,
wherein the tubular element is a one-piece tubular element,
wherein the at least one frame element comprises a belt section intended and suitable for arranging a belt device thereon, the belt section being provided in an upper region of the backrest element, and
wherein at a lower end of the belt section, along a longitudinal axis X, two portions of the tubular element are abutted substantially along a height axis Z, wherein the belt section is formed in such a way that it delimits a first inner surface.

2. The backrest element according to claim 1,
wherein the backrest element comprises a lower region suitable and intended for providing support in a lumbar region of an occupant, while the upper region of the backrest is suitable and intended for providing support in a shoulder region of the occupant and/or for receiving or providing a headrest.

3. The backrest element according to claim 1,
wherein a first plate-like element being arranged in the first inner surface, at least in sections, the first plate-like element being arranged on the belt section by means of a material connection.

4. The backrest element according to claim 2,
wherein the upper region of the backrest element comprises the at least one frame element, wherein only one frame element is provided in the upper region of the backrest element, wherein the frame element is arranged on a lower backrest element portion forming the lower region of the backrest element.

5. The backrest element according to claim 1,
wherein a lower region of the backrest element and the upper region of the backrest element comprise the at least one frame element, wherein only one frame element is provided.

6. The backrest element according to claim 5,
wherein a lower portion of frame element comprises two loop-like segments spaced from each other along a width axis Y, at which the loop-like segments each enclosing a second inner surface wherein a second plate-like element is arranged in or on each of the second inner surfaces, at least in sections, wherein the respective second plate-like element is arranged on the respective loop-like segment by means of a material connection.

7. The backrest element according to claim 6,
wherein the respective loop-like segment comprises a third section of the tubular element extending downwardly along the longitudinal axis X and a fourth section of the tubular element extending upwardly along the longitudinal axis (X), the third section being connected to the fourth section via a bent fifth section of the tubular element, wherein in a lower portion of the loop-like segment, the third portion and the fourth portion are spaced apart along the height axis Z, wherein in an upper portion of the loop-like segment, the third portion and the fourth portion are adjacent to each other, and wherein a first transverse section of the tubular element is provided extending along the width axis Y between the upper portions of the two loop-like segments.

8. The backrest element according to claim 3, wherein at least one further plate-like element and/or a support strut is arranged on the frame element, the further plate-like element and/or the support strut being arranged on the frame element by means of a material connection.

9. A Vehicle seat with a backrest element according to claim 1.

10. Method of manufacturing a backrest element according to claim 1 for a vehicle seat, comprising the following steps:

provividgn the tube element;

Bending the tube element a plurality of times by means of a first tube bending machine, thereby creating a preform;

Applying a rod-like auxiliary tool; and

Bending the preform about the rod-like auxiliary tool such that a lower end of the preform is brought to a middle section of the preform.

11. A backrest element for a vehicle seat, wherein the backrest element comprises at least one frame element which is formed by a tubular element and shapes at least one section of the backrest element, a contour of the at least one frame element being given by a plurality of bends of the tubular element and being designed in such a way that at least one inner surface is enclosed by the tubular element, wherein a lower region of the backrest element and an upper region of the backrest element comprise the at least one frame element, wherein only one frame element is provided, and wherein a lower portion of frame element comprises two loop-like segments spaced from each other along a width axis Y, wherein the loop-like segments each enclose a second inner surface, wherein a second plate-like element is arranged in or on each of the second inner surfaces, at least in sections, and wherein the respective second plate-like element is arranged on the respective loop-like segment by means of a material connection.

12. The backrest element according to claim 11, wherein the lower region is suitable and intended for providing support in a lumbar region of an occupant, and wherein the upper region is suitable and intended for providing support in a shoulder region of the occupant and/or for receiving or providing a headrest.

13. The backrest element according to claim 11, wherein the frame element comprises a belt section intended and suitable for arranging a belt device thereon, the belt section being provided in the upper region of the backrest element, wherein at a lower end of the belt section, along a longitudinal axis X, two portions of the tubular element are abutted substantially along a height axis Z.

14. The backrest element according to claim 13, wherein the belt section is formed in such a way that it delimits a first inner surface, wherein a first plate-like element is arranged in this first inner surface, at least in sections, the first plate-like element being arranged on the belt section by means of a material connection.

15. The backrest element according to claim 11, wherein the respective loop-like segment comprises a third section of the tubular element extending downwardly along a longitudinal axis X and a fourth section of the tubular element extending upwardly along the longitudinal axis X, the third section being connected to the fourth section via a bent fifth section of the tubular element, wherein in a lower portion of the loop-like segment, the third portion and the fourth portion are spaced apart along a height axis Z, wherein in an upper portion of the loop-like segment, the third portion and the fourth portion are adjacent to each other, wherein a first transverse section of the tubular element is provided extending along the width axis Y between the upper portions of the two loop-like segments.

16. The backrest element according to claim 11, wherein at least one further plate-like element and/or a support strut is arranged on the frame element, the further plate-like element and/or the support strut being arranged on the frame element by means of a material connection.

* * * * *